United States Patent
Anbiah et al.

(10) Patent No.: US 6,690,671 B1
(45) Date of Patent: *Feb. 10, 2004

(54) LOAD BALANCED UBR ROUTING IN ATM NETWORKS

(75) Inventors: Anix Anbiah, Cranberry Township, PA (US); Mark Held, Pittsburgh, PA (US); Sunil Jagannaph, Wexford, PA (US)

(73) Assignee: Marconi Communications, Inc., Warrendale, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/135,093

(22) Filed: Aug. 17, 1998

(51) Int. Cl.[7] .............................................. H04L 12/56
(52) U.S. Cl. .................... 370/395.43; 370/238; 709/105
(58) Field of Search ................................ 370/389, 395, 370/412, 236, 230, 414, 328, 395.43, 256, 233, 395.1, 351, 238, 337, 332; 709/104, 241, 238, 224, 105, 203, 225, 226; 359/110, 118; 707/10; 455/12.1; 375/356

(56) References Cited

U.S. PATENT DOCUMENTS

| | | | | |
|---|---|---|---|---|
| 5,687,167 A | * | 11/1997 | Bertin et al. ................ 370/254 |
| 5,748,629 A | * | 5/1998 | Caldara et al. .............. 370/389 |
| 5,850,399 A | * | 12/1998 | Ganmukhi et al. .......... 370/412 |
| 5,872,773 A | * | 2/1999 | Katzela et al. ............... 370/256 |
| 6,003,062 A | * | 12/1999 | Greenberg et al. ........... 709/104 |
| 6,094,687 A | * | 7/2000 | Drake, Jr. et al. ........... 709/241 |
| 6,246,687 B1 | * | 6/2001 | Siu ............................. 370/395 |
| 6,256,309 B1 | * | 7/2001 | Daley et al. ............ 370/395.43 |

\* cited by examiner

*Primary Examiner*—John Pezzlo
(74) *Attorney, Agent, or Firm*—Ansel M. Schwartz

(57) ABSTRACT

A system for sending data. The system includes a telecommunications network which supports connections. Each connection has a first attribute. The first attribute is that the connection has unspecified traffic. The network includes switches, and links which connect the switches. The system includes a routing module connected to the switches. The routing module has a mechanism for attributing a second attribute associated with transmission to each connection on the network. The second attribute is different than the first attribute. The routing module forms connections on the network based on the first attribute and the second attribute. A method for sending data. The method includes the steps of defining a telecommunications network which supports a connection having a first attribute. The first attribute is that the connection has unspecified traffic which travels on the connection. Then there is the step of attributing a second attribute associated with transmission to the connection on the network. The second attribute is different than the first attribute. Next there is the step of forming the connection on the network based on the first attribute and second attribute.

18 Claims, 2 Drawing Sheets

ACR AVAILABLE CELL RATE IN MB
AB LB-UBR ACCUMULATED B AND WITH IN MB
LC LB-UBR CONGESTION

ACR AVAILABLE CELL RATE IN MB
AB LB-UBR ACCUMULATED B AND WITH IN MB
LC LB-UBR CONGESTION

LOAD BALANCED UBR ROUTING IN ATM NETWORKS

FIELD OF THE INVENTION

The present invention is related to UBR routing in ATM networks. More specifically, the present invention is related to load balanced UBR routing of virtual circuits in ATM networks based on the bandwidth of the virtual circuits.

BACKGROUND OF THE INVENTION

Asynchronous Transfer Mode (ATM) networks are networks that support Virtual Circuits (VCs) of various service categories of traffic such as Constant Bit Rate (CBR), Variable Bit Rate (VBR) and Unspecified Bit Rate (UBR). These different service categories have different traffic characteristics and are used for different purposes. ATM networks use link state routing for routing the VCs. One of the desirable features of a link state routing protocol is Load Balancing. The efficiency with which a link state routing protocol load balances VCs in an ATM network determines how congested the network becomes under heavy traffic. A routing protocol that efficiently load balances VCs would minimize congestion in the network.

Load Balancing issues for UBR are different from that of VBR and CBR. When VBR and CBR VCs are signaled in an ATM network, they are specified with the bandwidth requirement for each such VC. This requirement specification is then used to reserve the bandwidth for each VC in the network. For UBR VCs, the bandwidth requirement is not specified and no bandwidth reservation is made in the network to support individual UBR VCs. The fact the UBR VCs do not have a bandwidth specified makes it harder to load balance UBR connections sensibly in ATM networks.

Connections are signaled as UBR connections either because their bandwidth requirement is unknown or, in the case where their bandwidth requirement is indeed known, they do not suit the other traffic characteristics such as the distribution of cell inter-arrival times of other service categories. In the case where the estimated bandwidth requirement of UBR VCs is known, this estimated bandwidth value can then be used to load balance UBR connections efficiently.

SUMMARY OF THE INVENTION

The present invention pertains to a system for sending data. The system comprises a telecommunications network which supports connections, each connection having a first attribute. The first attribute is that the connection has unspecified traffic. The network comprises switches, and links which connect the switches. The system comprises a routing module connected to the switches. The routing module has a mechanism for attributing a second attribute associated with transmission to each connection on the network. The second attribute is different than the first attribute. The routing module forms connections on the network based on the first attribute and the second attribute.

The present invention pertains to a method for sending data. The method comprises the steps of defining a telecommunications network which supports a connection having a first attribute. The first attribute is that the connection has unspecified traffic which travels on the connection. Then there is the step of attributing a second attribute associated with transmission to the connection on the network. The second attribute is different than the first attribute. Next there is the step of forming the connection on the network based on the first attribute and second attribute.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
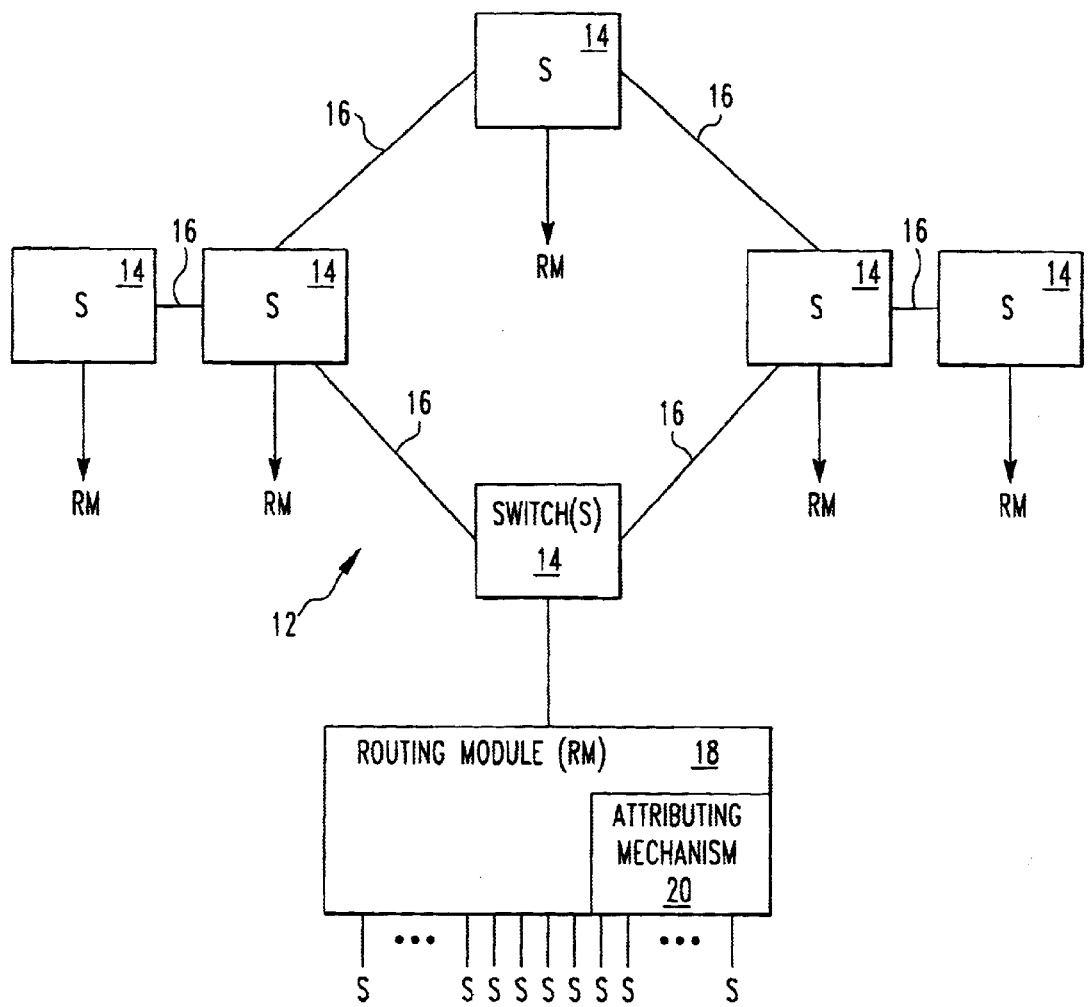
FIG. 1 is a schematic representation of the system of the present invention.
Figure 2:
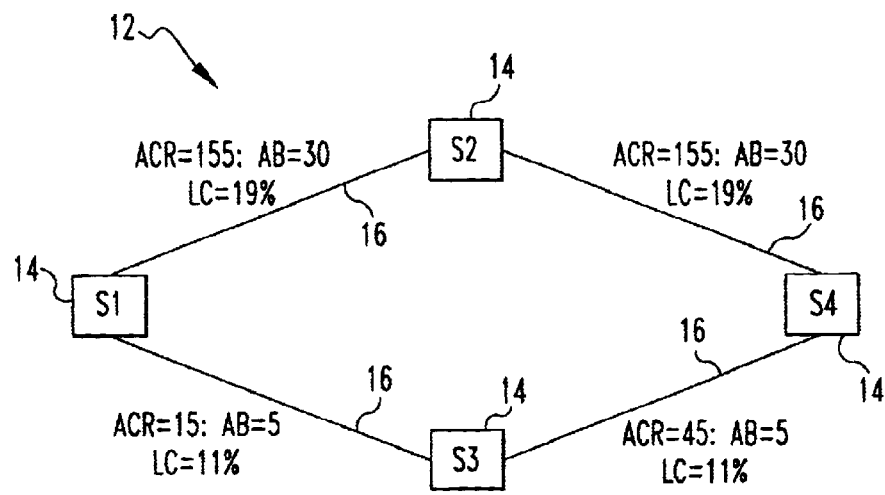
FIG. 2 is a schematic representation of a system of the present invention having four switches and four links connecting the switches.

Referring now to the drawings wherein like reference numerals refer to similar or identical parts throughout the several views, and more specifically to FIG. 1 thereof, there is shown a system 10 for sending data. The system 10 comprises a telecommunications network 12 which supports connections, each connection having a first attribute. The first attribute is that the connection has unspecified traffic. The network 12 comprises switches 14, and links 16 which connect the switches 14. The system 10 comprises a routing module 18 connected to the switches 14. The routing module 18 has a mechanism 20 for attributing a second attribute associated with transmission to each connection on the network 12. The second attribute is different than the first attribute. The routing module forms connections on the network 12 based on the first attribute and the second attribute.

Preferably, the network 12 includes an ATM network 12, and the connections include virtual circuits. The first attribute of the virtual circuits preferably is that the virtual circuits are of a UBR service category regarding traffic. Preferably, the routing module 18 forms virtual circuits on the network 12 so they are load balanced.

The second attribute preferably corresponds to bandwidth associated with a respective virtual circuit, and the routing module 18 forms the virtual circuits on the networks 12 so they are load balanced based upon the UBR traffic category of the virtual circuit and the bandwidth of the virtual circuit. Preferably, the routing module forms the virtual circuits on the networks 12 so they are load balanced based upon the UBR traffic category of the virtual circuit and the bandwidth of the virtual circuit and a maximum percentage of unused bandwidth across all links 16 of the network 12 is achieved. The links 16 preferably have paths that are of unequal size in regard to traffic carrying capacity. Preferably, the routing module allows for over booking so all virtual circuits can be established. The network 12 and the routing module 18 preferably also support virtual circuits having specified bit rate categories of traffic.

Figure 3:
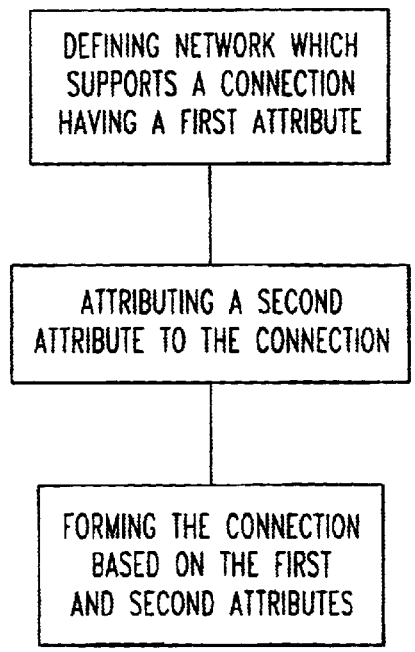
FIG. 3 is a flow chart of the method of the present invention.

The present invention pertains to a method for sending data, as shown in FIG. 3. The method comprises the steps of defining a telecommunications network 12 which supports a connection having a first attribute. The first attribute is that the connection has unspecified traffic which travels on the connection. Then there is the step of attributing a second attribute associated with transmission to the connection on the network 12. The second attribute is different than the first attribute. Next there is the step of forming the connection on the network 12 based on the first attribute and second attribute.

Preferably, the defining step includes the step of defining an ATM network 12 which supports the connection, and wherein the connection has a virtual circuit. The defining the ATM network 12 step preferably includes the step of defining the virtual circuit as having the first attribute and wherein the first attribute is that the first circuit is of a UBR service category of traffic which is supported by the virtual circuit. Preferably, the forming step includes the step of forming the virtual circuit on the ATM network 12 so the virtual circuit is load balanced with other virtual circuits on the network 12.

The second attribute preferably corresponds to bandwidth of the virtual circuit and wherein the forming step includes the step of forming the virtual circuit on the network 12 so the virtual circuit is load balanced with other virtual circuits on the network 12 based on the UBR traffic category of the virtual circuit and the bandwidth of the virtual circuit. Preferably, the forming step includes the step of forming the virtual circuit on the network 12 so the virtual circuit is load balanced with the other virtual circuits on the network 12 based on the UBR traffic category of the virtual circuit and the bandwidth of the virtual circuit and a maximum percentage of unused bandwidth across all links 16 of the network 12 is achieved. Preferably, the forming step includes the step of forming the virtual circuit on the network 12 so the virtual circuit is load balanced with other virtual circuits and the routing of the virtual circuit is balanced across unequal sized transmission paths.

Before the forming step there is preferably the step of determining whether any links 16 in the network 12 have available bandwidth to support the virtual circuit. Preferably, the forming step includes the step of forming the virtual circuit even though the sum of all the virtual circuit in the network 12 is greater than the sum of the bandwidth available for the UBR traffic that the network 12 can actually support. The forming step preferably includes forming the virtual circuit on a path having the lowest percentage of utilization when all the paths have a utilization greater than one hundred percent. Preferably, the forming step includes the step of finding the path, which if the virtual circuit is added to it, will maximize the percentage of unused bandwidth across all links 16 when all the paths have a utilization less than one hundred percent; and forming the virtual circuit on the path which will maximize the percentage of unused bandwidth across all links 16.

In the operation of the invention, Load Balanced UBR is a feature which will allow users to balance UBR traffic across available paths of arbitrary size in large ATM networks 12. Without this capability UBR traffic is routed only through the highest bandwidth, lowest cost path. The result in UBR-only networks 12 is that certain paths become saturated with traffic while alternative routes are unused.

This feature will provide a new method for load balancing UBR calls across the network 12 based on the estimated bandwidth of individual calls in "Cells Per Second" and the percent of usage across all available links 16. Weighted UBR provides the administrator with the ability to associate an estimated bandwidth (cell rate) value with each UBR VC. This estimate should be specified in units of Cells/Sec. The bandwidth estimates are used in two ways: 1. By the routing module 18 to determine if any particular link 16 has the available bandwidth to support the connection and; 2. Generally, as each UBR virtual circuit is identified, the administrator associates an estimated bandwidth with the virtual circuit which is stored in the routing module 18. The routing module 18, aware of the state of the network 12, and thus the links 16 and switches 14 on it, as is well known in the art, determines whether all the paths available have greater than 100 percent utilization or less than 100 percent utilization. If the utilization of all available paths on the links 16 is greater than 100 percent, the routing module 18 directs the virtual circuit to the path with the lowest utilization over 100 percent. If the utilization is less than 100 percent, then the routing module 18 chooses a path for the virtual circuit which results in the maximum percentage of unused bandwidth, as explained above. The actual sending or discarding of the cell then proceeds as is well known in the art.

If S1 is the source of a new VC with 3 MB estimated UBR bandwidth and S4 is the destination, then the LB-UBR load balancing algorithm will choose the path S1–S3–S4 over S1–S2–S4 for the following reason. If the estimated bandwidth of the new connection is factored in, then the new AB for the links 16 S1–S2 and S2–S4 will be 33 MB and the corresponding LC will be 21%. For links 16 S1–S3 and S3–S4, the new AB will be 8 MB and the corresponding LC will be 17%. These figures favor the path S1–S3–S4.

Once the routing decision is made, the VC setup will be forwarded by S1 to S3 and later by S3 to S4. Each switch 14 accumulates the UBR bandwidth of the new connection for each link 16 in both directions. Once the connection has been setup, then the new AB of 8 MB will be advertised for links 16 S1–S3 and S3–S4. The routing decision for any new VC setup will be based on these new values.

Generally, as each UBR virtual circuit is identified, the administrator associates an estimated bandwidth with the virtual circuit which is stored in the routing module 18. The routing model 18, aware of the state of the network 12, and thus the links 16 and switches 14 on it, as is well known in the art, determines whether all the paths available have greater than 100 percent utilization or less than 100 percent utilization. If the utilization of all available paths on the links 16 is greater than 100 percent, the routing module 18 directs the virtual circuit to the path with the lowest utilization over 100 percent. If the utilization is less than 100 percent, then the routing module 18 chooses a path for the virtual circuit which results in the maximum percentage of unused bandwidth, as explained above. The actual sending or discarding of the cell then proceeds as is well known in the art.

By simply estimating the bandwidth of the virtual circuit, without having to actually determine the bandwidth (although this could also be performed to obtain improved results), allows the UBR class of cells to more efficiently be sent and thus the overall network to be more organized. No change needs to be made to any other class of cells, such as ABR, CBR or VBR. This system and method described herein works within the allocation for the UBR class of traffic.

When a given circuit is routed, load balancing occurs only among the shortest paths from the source of the circuit to the destination. This can be explained as follows. Each link of the network has an administrative "cost" associated with it. The cost of a path is the sum of the costs of the links that make up the path. For instance, if there are two paths of cost 500 and one path of cost 600, then only the shortest paths are considered (i.e., the paths with cost 500) for load balancing if they have the sufficient bandwidth to support the VC. The 600 cost path is ignored even though it may have a greater percentage of unused bandwidth.

When load balancing among the shortest path occurs, the path with the maximum percentage of unused bandwidth is chosen. This means that the percentage of unused bandwidth of a path is the percentage of unused bandwidth on the link that has the least percentage of unused bandwidth among all the links that make up that path (most congested link along the path).

Implementation of the Load Balanced UBR feature makes the following assumptions.
1. It is assumed that an ATM link state routing protocol such as the ATM Forum's PNNI [*Private Network-Network Interface Specification* v1.0, The ATM Forum, af-pnni-0055.000, March 1996, incorporated by reference herein] is available to be enhanced with this feature. Implementation details of such a routing protocol is beyond the scope of this document.
2. It is assumed that the link state routing protocol has a mechanism for propagating the ACR and AB values for individual links 16 as part of their link state. The LC parameter can be calculated for any given link 16, given the ACR and AB values for that link 16.
3. It is assumed that the link 16 state routing protocol uses the Djikstra algorithm for computing Shortest Path Trees (SPTs), incorporated by reference herein. The algorithm explained in the following section is presented as an enhancement to the Djikstra algorithm.
4. It is assumed that the link state routing protocol uses a Generic Call Admission Control (GCAC) algorithm similar to the Simple GCAC described in the ATM Forum PNNI specification [*Private Network-Network Interface Specification* v1.0, The ATM Forum, af-pnni-0055.000, March 1996, incorporated by reference herein].

Path Computation (PC) for a VC in through an ATM network 12 usually happens in two stages. Following are the two stages.
i) Computation of the SPT of all the links 16 in the network 12 that satisfy the PC constraints of the VC (such as the bandwidth requirement and cell loss ratio), with the source of the VC as the root of the SPT.
ii) Building of a Designated Transit List (DTL) [*Private Network-Network Interface Specification* v1.0, The ATM Forum, af-pnni-0055.000, March 1996, incorporated by reference herein], which is a source route from the source of the VC to the destination of the VC. This is done in the reverse order, starting at the destination of the VC and walking the SPT towards the source of the tree until the source is reached adding each node traversed to a list. The list is then reversed to obtain the DTL.

Generic Call Admission Control (GCAC) is an algorithm used to determine if a link 16 advertised by the routing protocol can support a given VC with given traffic characteristics such as bandwidth requirement and cell loss ratio requirement. The modifications required in the GCAC algorithm to support LB-UBR is presented.

The GCAC algorithm needs to be modified in order to support Load Balanced UBR. Usually, there is no requirement placed on UBR VCs by the GCAC algorithm. Since there are no bandwidth or any other requirement for regular UBR VCs, no link 16 in the network 12 is eliminated during the GCAC step of the Path Computation procedure. However, this is not true for UBR VCs routed under the LB-UBR feature. Since there is now an estimated bandwidth used for individual UBR VCs, the GCAC algorithm is modified to compare the estimated bandwidth value of the UBR VC with the value of bandwidth available for UBR connections. This value is the difference between the total bandwidth available for UBR VCs (ACR) and the Accumulated Bandwidth value (AB) for any given link 16.

Path Computation goes through two passes when computing a path for UBR VCs. In the first pass, the estimated bandwidth value is taken into account when performing the GCAC algorithm. If there is no path found in the first pass that satisfies the estimated bandwidth requirement, then a second pass is performed after relaxing the bandwidth requirement. For this reason, a UBR VC is never rejected due to insufficient bandwidth. Therefore, the LB-UBR congestion value explained above can exceed 100% and overbooking can occur.

The algorithm described in the Appendix computes that Shortest Path Tree for a given network 12 using the Djikstra's algorithm. A network 12 is represented as a set of nodes and links 16. Nodes represent switches 14 in an ATM network 12 and links 16 represent logical links 16 (paths) between switches 14). Each link 16 in the network 12 has a cost associated with it. The shortest path cost sum of each link 16 and of each node is computed as the cumulative sum of the costs of all the links 16 that comprise the shortest path to that link 16 or the node from the source.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:
1. A method for sending data comprising the steps of:
defining an ATM telecommunications network which supports a connection having a virtual circuit of a UBR service category;
attributing an estimated bandwidth associated with transmission to the virtual circuit on the network; and
forming the virtual circuit on the network based on its estimated bandwidth and its UBR service category so the virtual circuit is load balanced with other virtual circuits on the network by comparing the estimated bandwidth value of the virtual circuit with a value of bandwidth available for virtual circuits having a UBR service category of traffic, where the value of the bandwidth for virtual circuits having a UBR service category is a difference between total bandwidth available for virtual circuits having a UBR service category of traffic and an accumulated bandwidth value for any given link to determine if the link can support the virtual circuit; identifying if there is a path of links for the virtual circuit that can support the estimated bandwidth value of the virtual circuit; and relaxing the estimated value of the virtual circuit to find the path if there is no path that can support the estimated bandwidth value of the virtual circuit.
2. A method as described in claim 1 wherein the forming step includes the step of forming the virtual circuit on the network so the virtual circuit is load balanced among the shortest paths with other virtual circuits on the network based on the UBR service category of traffic of the virtual circuit and the bandwidth of the virtual circuit.
3. A method as described in claim 2 wherein the forming step includes the step of forming the virtual circuit on the network so the virtual circuit is load balanced among the shortest paths with the other virtual circuits on the network based on the UBR traffic category of the virtual circuit and the bandwidth of the virtual circuit and a maximum percentage of unused bandwidth across all links of the network is achieved.
4. A method as described in claim 3 wherein the forming step includes the step of forming the virtual circuit on the network so the virtual circuit is load balanced with other virtual circuits and the routing of the virtual circuit is balanced across unequal sized transmission paths.

5. A method as described in claim 4 wherein before the forming step there is the step of determining whether any links in the network have available bandwidth to support the virtual circuit.

6. A method as described in claim 5 wherein the forming step includes the step of forming the virtual circuit even though the sum of all the virtual circuit in the network is greater than the sum of the bandwidth available for the UBR traffic that the network can actually support.

7. A method as described in claim 6 wherein the forming step includes forming the virtual circuit on a path having the lowest percentage of utilization when all the paths have a utilization greater than one hundred percent.

8. A method as described and claim 7 wherein the forming step includes the step of finding the path, which if the virtual circuit is added to it, will maximize the percentage of unused bandwidth across all links when all the paths have a utilization less than one hundred percent; and forming the virtual circuit on the path which will maximize the percentage of unused bandwidth across all links.

9. A system for sending communications comprising:
   an ATM telecommunications network which supports connections, each connection having a virtual circuit of a UBR service category regarding traffic, said network comprised of switches, and links which connect the switches; and
   a routing module connected to the switches, said routing module having a mechanism for attributing an estimated bandwidth associated with transmission to each virtual circuit on the network, said routing module forming virtual circuits on the network based on the virtual circuits' estimated bandwidth and UBR traffic category so the virtual circuit is load balanced with other virtual circuits on the network, the routing module forms a virtual circuit by comparing the estimated bandwidth value of the virtual circuit with a value of bandwidth available for virtual circuits having a UBR service category of traffic, where the value of the bandwidth for virtual circuits having a UBR service category is a difference between total bandwidth available for virtual circuits having a UBR service category of traffic and an accumulated bandwidth value for any given link to determine if the link can support the virtual circuit; identifying if there is a path of links for the virtual circuit that can support the estimated bandwidth value of the virtual circuit; and relaxing the estimated value of the virtual circuit to find the path if there is no path that can support the estimated bandwidth value of the virtual circuit.

10. A system as described in claim 9 wherein the routing module forms the virtual circuits on the networks so they are load balanced based upon the UBR traffic category of the virtual circuit and the bandwidth of the virtual circuit and a maximum percentage of unused bandwidth across all links of the network is achieved.

11. A system as described in claim 10 wherein the links have paths that are of unequal size in regard to traffic carrying capacity.

12. A system as described in claim 11 wherein the routing module allows for over booking so all virtual circuits can be established.

13. A system as described in claim 12 wherein the network and the routing module also support virtual circuits having specified bit rate categories of traffic.

14. A system as described in claim 13 wherein the communications are multimedia, audio, video or data.

15. A method for distributing traffic over paths comprising:
   sending traffic over a path of the paths of a network; and
   allocating a second transmission to a path of the paths by load balancing by selecting the path that would have the highest percentage of unused bandwidth after allocation, wherein the load balancing is based on a determination of a relative percentage of remaining available bandwidth across each of the paths if the transmission was to be allocated.

16. A method as described in claim 15 wherein the allocating step further comprises determining the highest percentage of unused bandwidth by comparing a percentage of unused bandwidth on a most congested link of each path.

17. A method as described in claim 16 wherein the traffic is unspecified traffic.

18. A method as described in claim 17 wherein the unspecified traffic is UBR traffic.

* * * * *